US006504264B2

(12) United States Patent
Ueno et al.

(10) Patent No.: US 6,504,264 B2
(45) Date of Patent: Jan. 7, 2003

(54) ACTIVATING DEVICE OF VEHICULAR PASSENGER PROTECTION SYSTEM

(75) Inventors: Yukiyasu Ueno, Nishio (JP); Yasuo Imamura, Kariya (JP)

(73) Assignee: Denso Corporation, Kariya (JP)

( * ) Notice: Subject to any disclaimer, the term of this patent is extended or adjusted under 35 U.S.C. 154(b) by 171 days.

(21) Appl. No.: 09/767,705

(22) Filed: Jan. 24, 2001

(65) Prior Publication Data

US 2001/0009337 A1 Jul. 26, 2001

(30) Foreign Application Priority Data

Jan. 25, 2000 (JP) ........................................ 2000-018068

(51) Int. Cl.$^7$ ............................................. B60R 21/32
(52) U.S. Cl. .................... 307/10.1; 307/9.1; 280/728.1; 340/436; 701/45
(58) Field of Search ............................ 307/10.1, 9.1; 280/728.1; 340/436; 701/45

(56) References Cited

U.S. PATENT DOCUMENTS 5,182,459 A    1/1993  Okano et al.
5,677,838 A   10/1997  Itou et al.
6,147,417 A * 11/2000  Ueno ......................... 307/10.1
6,169,336 B1 *  1/2001  Hayashi et al. ............. 307/10.1

FOREIGN PATENT DOCUMENTS

JP           9-99801      4/1997
JP          11-29000      2/1999
JP         11-507893      7/1999

* cited by examiner

Primary Examiner—Brian Sircus
Assistant Examiner—Robert L. DeBeradinis
(74) Attorney, Agent, or Firm—Harness, Dickey & Pierce, PLC

(57) ABSTRACT

An activating device for an airbag system is constructed to prevent erroneous activating operation. A microcomputer generates a test signal and applies it to a determination circuit and an inhibition circuit as an inhibition signal. The determination circuit grounds the gate of a switching element which activates an airbag. The inhibition circuit inhibits a switching element from being turned on based on the inhibition signal. In the ON-inhibition state, the switching element is turned on if it is normal with the gate grounded. The switching element remains OFF if it is in malfunction.

7 Claims, 9 Drawing Sheets

US 6,504,264 B2

ACTIVATING DEVICE OF VEHICULAR PASSENGER PROTECTION SYSTEM

CROSS REFERENCE TO RELATED APPLICATION

This application is based on and incorporates herein by reference Japanese Patent Application No. 2000-18068 filed Jan. 25, 2000.

BACKGROUND OF THE INVENTION

This invention relates to an activating device used for a vehicular passenger protection system such as an airbag system, belt pretensioner, or the like mounted on a vehicle.

Heretofore, for example, a mechanical switch has been employed as a switch for supplying an activating current to squib in an activating device of a vehicular airbag system. Because the mechanical switch is prevented from malfunction even though erroneous operation of a microcomputer mainly due to erroneous operation of a built-in CPU occurs, the mechanical switch has been employed as a safety switch for activating squib.

However, the mechanical switch is expensive and large-sized disadvantageously. Furthermore, because the closing retention time of the mechanical switch is short, the closing retention time required for the delayed control in which an airbag is started with retardation from the activating of a belt pretensioner or the retardation time between the first step and second step of a two-step activating airbag is controlled is not secured. As a result, the activating device is not sufficient in the passenger protection performance disadvantageously.

Therefore, recently there is increasing need for replacing a mechanical switch with an electronic switch in order to reduce the cost and in order to improve the passenger protection performance.

Generally, an activating device has the structure in which a plurality of electronic switching elements are connected to a squib in series in the case that a mechanical switch is replaced with an electronic switch. However, it is required for replacing a mechanical switch with an electronic switch that these plurality of electronic switching elements will not be erroneously turned on simultaneously due to erroneous operation of a microcomputer, that is, an airbag system is prevented from being erroneously activated.

Particularly, the close attention must be paid when one electronic switching element is turned on forcedly for failure diagnosis because redundancy of erroneous activating prevention is reduced.

SUMMARY OF THE INVENTION

It is an object of the present invention to provide an activating device used for a vehicular passenger protection system that prevents erroneous activation due to erroneous operation of a microcomputer.

According to the present invention, a plurality of electronic switching elements is connected in series each other with a squib to activate the squib when turned on. The electronic switching elements include a diagnosis target switching element and a non-diagnosis target switching element. First and second acceleration sensors detect acceleration of a vehicle, respectively. A first vehicle collision is determined based on at least a detection output of the first acceleration sensor, and a second vehicle collision is also determined separately by a microcomputer based on at least a detection output of the second acceleration sensor. The diagnosis target switching element is turned on based on at least the first vehicle collision determination, and remaining electronic switching elements are turned on based on at least the second vehicle collision determination. The diagnosis target switching element is forcedly turned on to be diagnosed with respect to its malfunction in response to a diagnosis signal produced from the microcomputer. The diagnosis target switching element and the non-diagnosis switching element are inhibited from being turned on concurrently regardless of an output condition of the microcomputer. Thus, the diagnosis target switching element is diagnosed only under a condition that the non-diagnosis target switching elements are being turned off.

DETAILED DESCRIPTION OF THE PREFERRED EMBODIMENTS

The present invention will be described hereinafter in detail with reference to various embodiments.

First Embodiment

Figure 1:
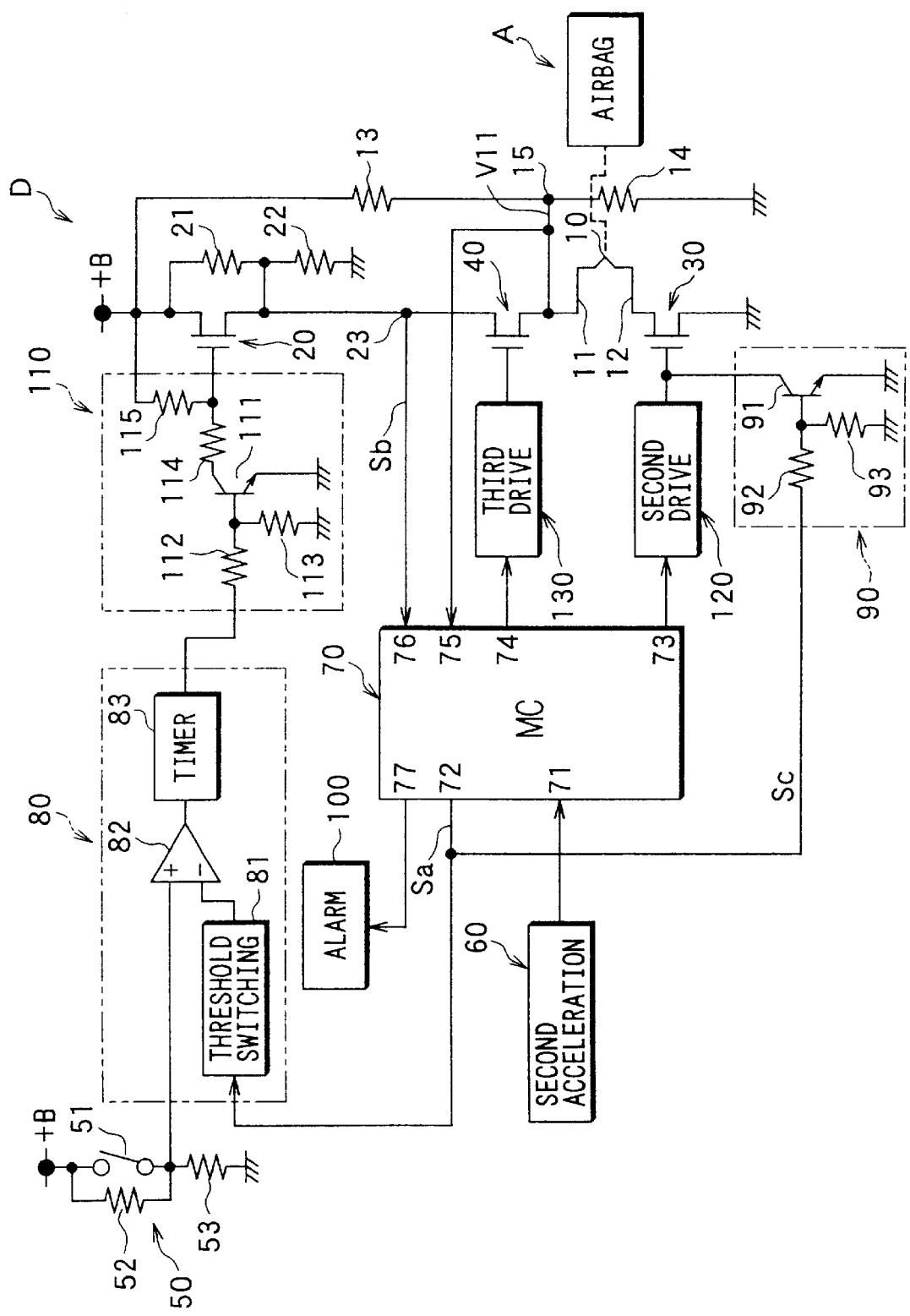
FIG. 1 is an electronic circuit diagram illustrating a first embodiment of the present invention.
Figure 2:
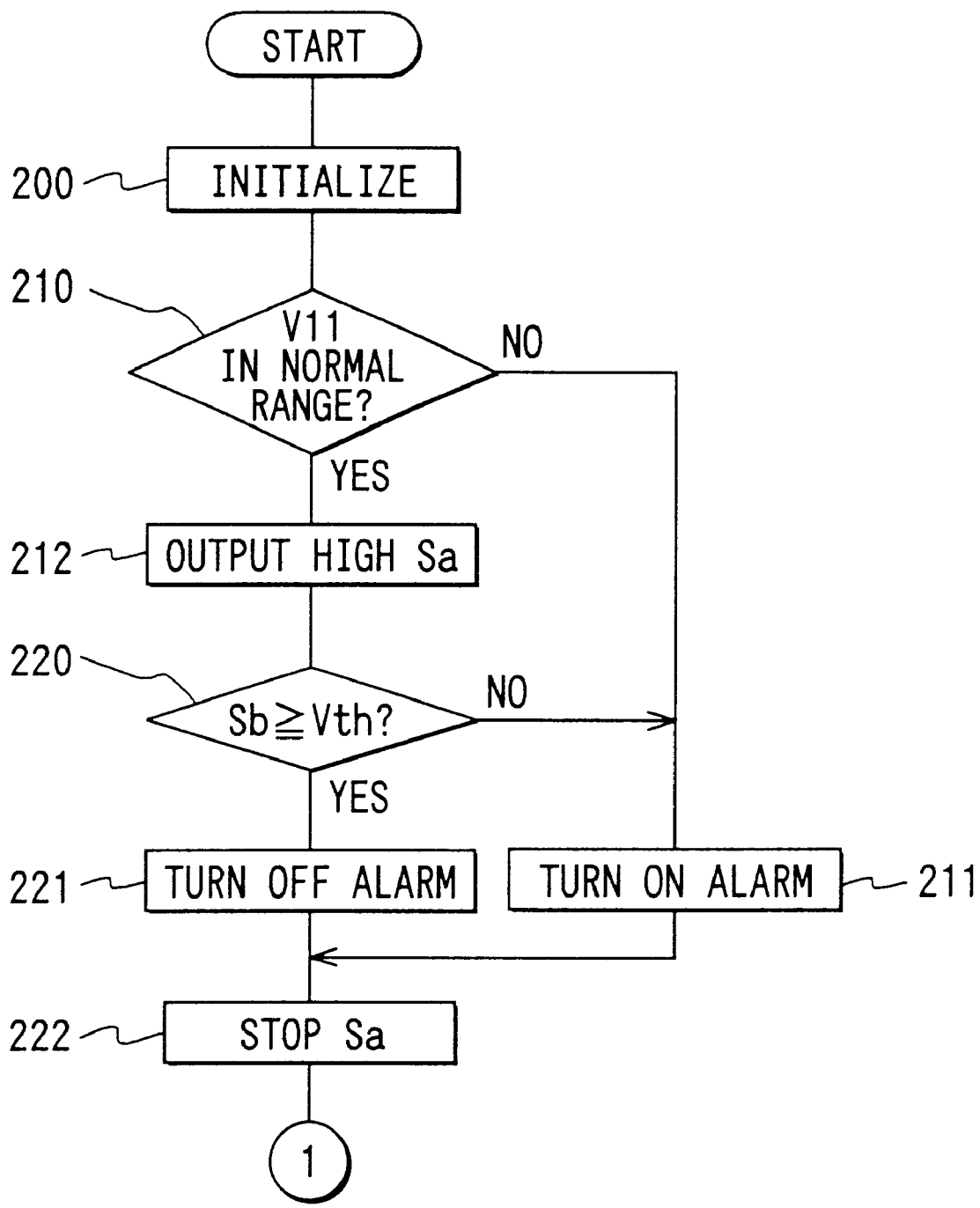
FIG. 2 is a part of a flow chart illustrating the operation of a microcomputer used in the first embodiment.
Figure 3:
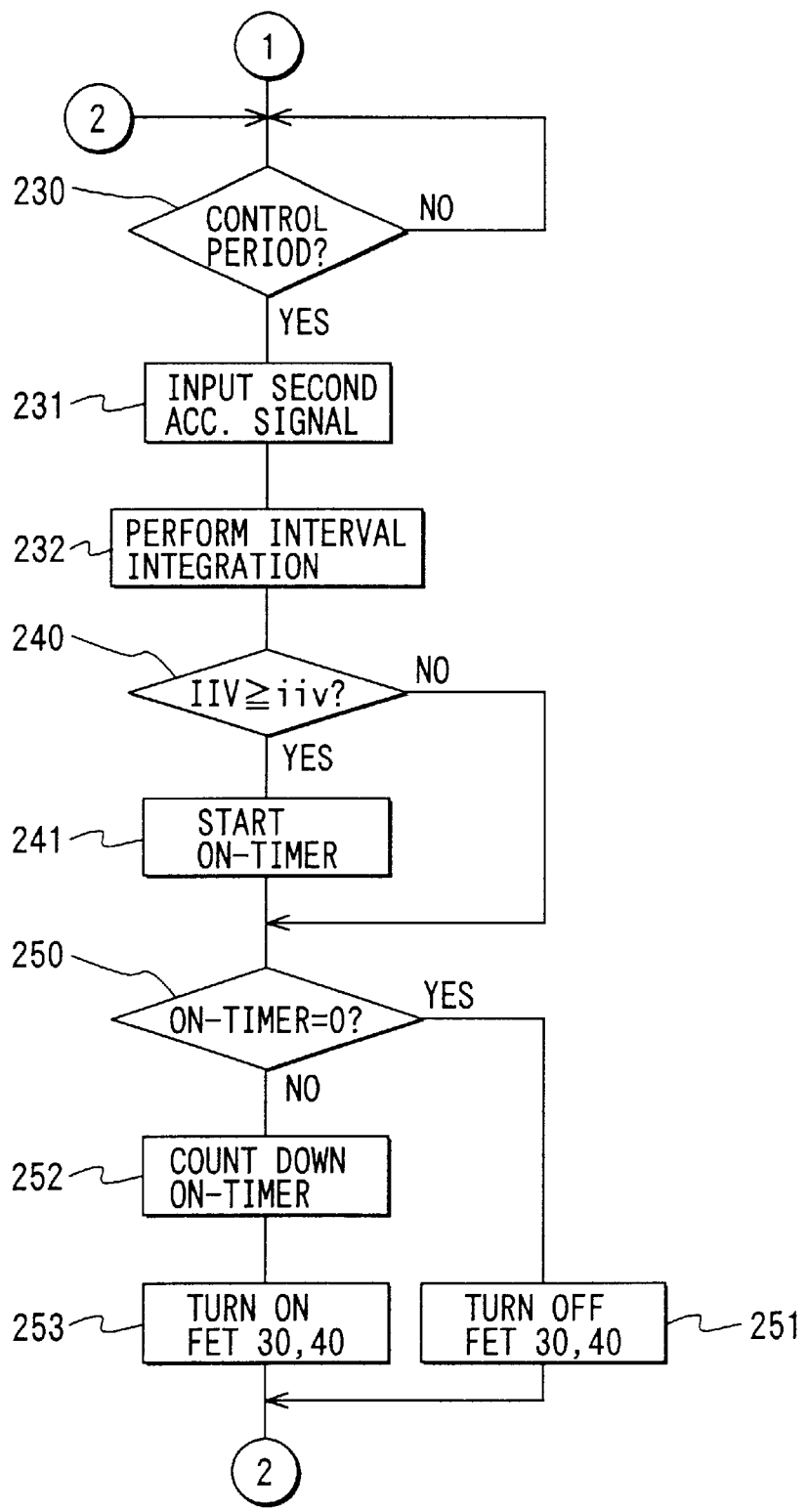
FIG. 3 is another part of the flow chart illustrating the operation of the microcomputer used in the first embodiment.

FIG. 1 to FIG. 3 show the first embodiment of a vehicular airbag system. The airbag system comprises an airbag device A mounted on a vehicle and an activating device D. The airbag device A is structured so as to expand an airbag with gas supplied from an inflator.

The activating device D is provided with a squib 10, and first to third electronic switching elements 20 to 40 connected to the squib 10 in series. Herein, the first and third electronic switching elements 20 and 40 comprise p-channel type field effect transistors (FETS), and the second electronic switching element 30 comprises an n-channel type field effect transistor (FET).

The source of the switching element 20 is connected to the positive terminal +B of a DC power source. The drain of the switching element 30 is connected to the negative terminal 12 of the squib 10, and the source of the switching element 30 is grounded. The drain of the switching element 40 is connected to the positive terminal 11 of the squib 10.

The activating device D is provided with two resistors 13 and 14 that are connected each other in series and two resistors 21 and 22 that are connected each other in series. The one terminal of the resistor 13 is connected to the positive terminal +B of the DC power source, and the other terminal of the resistor 13 is grounded through the resistor 14. The common terminal 15 of both resistors 13 and 14 is connected to the positive terminal 11 of the squib 10.

Thereby, the voltage of the positive terminal 11 of the squib 10 (positive terminal voltage V11) is equal to the voltage (the voltage applied on the common terminal 15) that is obtained by dividing the power source voltage of the DC power source with both resistors 13 and 14 when both switching elements 30 and 40 are turned off simultaneously. The positive terminal voltage V11 decreases approximately to the ground potential when the switching element 30 is turned on.

Both terminals of the resistor 21 are connected to the source and drain of the switching element 20 respectively, and the resistor 21 is grounded through the resistor 22. Thereby, the voltage that is obtained on the common terminal 23 of both switching elements 20 and 40 (voltage Sb) is equal to the voltage that occurs by dividing the power source voltage of the DC power source with both resistors 21 and 22 when both switching elements 20 and 40 are turned off simultaneously. The voltage Sb increases approximately to the power source voltage of the DC power source.

The activating device D is provided with a first and second acceleration (deceleration) sensors 50 and 60. The first acceleration sensor 50 is provided with a normally open type mechanical switch 51 and two resistors 52 and 53. The mechanical switch 51 is turned on when it detects the acceleration (deceleration) due to collision of the vehicle. A fixed contact point of the mechanical switch 51 is connected to the positive terminal +B of the DC power source, and the movable contact point of the mechanical switch 51 is grounded through the resistor 53, which are connected each other in series. The resistor 52 is connected to the mechanical switch 51 in parallel.

Thereby, acceleration sensor 50 divides the DC power source voltage with both resistors 52 and 53 and generates the divided voltage (output voltage Vc) from the output terminal that is the common terminal of both resistors 52 and 53 in the state that the mechanical switch 51 is turned off. Furthermore, the acceleration sensor 50 generates the power source voltage (output voltage va) of the DC power source from the output terminal based on the ON state of the mechanical switch 51.

Thus, the acceleration sensor 50 generates the output voltage Va based on the ON state of the mechanical switch 51 when the vehicle collides. Therefore, the output voltage Vc generated from the acceleration sensor 50 in the state that the vehicle does not collide corresponds to no generation of the acceleration detection voltage.

The second acceleration sensor 60 comprises a semiconductor-type acceleration sensor, and the acceleration sensor 60 generates an acceleration detection signal that is proportional to the detected acceleration of the vehicle as an analog voltage. The output terminal of the first acceleration sensor 60 is connected to the input port 71 of a microcomputer 70.

Furthermore, the activating device D is provided with the microcomputer 70, a determination circuit or diagnosis circuit 80, an inhibition circuit 90, and an alarm light 100, and first to third drive circuits 110 to 130. The microcomputer 70 comprises a CPU, a ROM, and other circuit elements, and executes a computer program according to flow charts shown in FIG. 2 and FIG. 3. In the execution, the microcomputer 70 performs various processes required for malfunction diagnosis of the determination circuit 80, the first drive circuit 110, and the switching element 20, and for inhibition of the inhibition circuit 90, and driving of the alarm light 100 and the second and third drive circuits 120 and 130. The power is supplied from a battery to the microcomputer 70 when an ignition switch of the vehicle is turned on, and the execution of the computer program is started. The computer program has been stored previously in the ROM of the microcomputer.

The determination circuit 80 that functions as a hardware circuit independent of the microcomputer 70, and the determination circuit 80 comprises a threshold voltage switching circuit 81, a comparator 82, and a timer 83. The threshold voltage switching circuit 81 is a circuit for switching the threshold voltage depending on whether the activating circuit D is operated in test mode or not.

The threshold voltage switching circuit 81 sets the threshold voltage to be a value Vb between both output voltages Va and Vc (Va>Vb>Vc) when the threshold voltage switching circuit 81 is operated in test mode. On the other hand sets the threshold voltage to be a value Vd (Vc>Vd) that is lower than the output voltage Vc. The threshold voltage of the threshold voltage switching circuit 81 is switched depending on the test signal Sa supplied from the microcomputer 70. The threshold voltage switching circuit 81 is operated in test mode when the high level test signal Sa is supplied. On the other hand the threshold voltage switching circuit 81 is operated in non-test mode when the low level testing signal Sa is supplied. The input terminal of the threshold voltage switching circuit 80 is connected to the output port 72 of the microcomputer 70.

The comparator 82 compares the output voltage Vc of the acceleration sensor 50 with the threshold voltage Vb of the threshold voltage switching circuit 81 when the vehicle is in non-collision state and the test mode is not started, and generates a low level comparison signal because of the relation Vc<Vb. On the other hand, the comparator 82 compares the output voltage Va of the acceleration sensor 50 with the threshold voltage Vb of the threshold voltage switching circuit 81 when the vehicle collides and non-test mode is started, and generates a high level comparison signal (vehicle collision determination output) because of the relation Va>Vb.

Furthermore, the comparator 82 compares the output voltage Vc of the acceleration sensor 50 with the threshold voltage Vd of the threshold voltage switching circuit 81 when the vehicle is in non-collision state and the test mode is started, and generates a high level comparison signal because of the relation Vc>Vd. The comparator 82 generates the same high level comparison signal (that is, it corresponds to the determination output supplied upon collision) as that generated when the vehicle collides because of the threshold voltage Vd of the threshold voltage switching circuit 80, even if the mechanical switch 51 is in off state in test mode.

The timer 83 starts to count the time based on the output of the high level comparison signal (rising) supplied from the comparator 82, and generates a high level timer signal at the same time when started. The counting time of the timer 83 is served to overlap ON state of the switching elements 30 and 40 during a predetermined overlap time (the time period equal to or longer than 2 ms, for example, 10 ms), when the vehicle collides.

In the present embodiment, for example, $\mu$PD5555 type timer IC, product of NEC CORPORATION, is employed as the timer 83.

The inhibition circuit 90 comprises a transistor 91 and two resistors 92 and 93. The base of the transistor 91 is connected to the output port 72 of the microcomputer 70 through both resistors 92 and 93, and the collector of the transistor 91 is connected to the gate of the switching element 30. The transistor 91 receives a test signal Sa as inhibition signal Sc from the microcomputer 70 through both resistors 92 and 93.

The transistor 91 is turned on to ground the gate of the switching element 30 when the test signal Sa is a high level signal, that is, when the inhibition signal Sc is a high level signal. Thus, the inhibition circuit 90 inhibits the switching element 30 to be turned on when the inhibition signal Sc is a high level signal. On the other hand, the transistor 91 is turned off when the test signal Sa is a low level signal, that is, when the inhibition signal Sc is a low level signal, and the gate of the switching element is thereby brought into non-grounded state. This means that the inhibition circuit 90 releases the switching element 30 from ON-inhibition when the inhibition signal Sc is a low level signal.

The first drive circuit 110 is provided with a transistor 111 and a plurality of resistors 112 to 115. The base of the transistor 111 is connected to the output terminal of the timer 83 of the determination circuit 80 through both resistors 112 and 113. The collector of the transistor 111 is connected to the gate of the first switching element 20 through the resistor 114. The one terminal of the resistor 115 is connected to the positive terminal +B of the DC power source, and the other terminal of the resistor 115 is connected to the collector of the transistor 111 through the resistor 114.

In the first drive circuit 110, the transistor 111 turns off the switching element 20 based on the output of a low level signal supplied from the timer 83, and turns on the switching element 20 based on the high level output supplied from the timer 83. That is, the first drive circuit 110 turns on the switching element 20 only when the determination circuit 80 generates a high level output, that is, when the vehicle collides or when the drive circuit D is operated in test mode.

The input terminal of the second drive circuit 120 is connected to the output port 73 of the microcomputer 70. Therefore, the second drive circuit 120 drives the second switching element 30 to be turned on or turned off under the control performed by the microcomputer 70 through the output port 73. Herein, the second drive circuit 110 comprises a single resistor because the second drive circuit 110 turns on/off the switching element 30 based on the low level or high level output supplied from the output port 73 of the microcomputer 70.

The input terminal of the drive circuit 130 is connected to the output port 74 of the microcomputer 70. Therefore, the third drive circuit 130 drives the switching element 40 to be turned on or off under the control performed by the microcomputer 70 through the output port 74. The third drive circuit 130 has the same structure as the first drive circuit 110.

In the structure of the first embodiment, it is assumed that the vehicle is brought into running state when the ignition switch is turned on. Furthermore, the microcomputer 70 starts the execution of the computer program according to the flow charts shown in FIG. 2 and FIG. 3 when the ignition switch is turned on.

Concomitantly with the activating, at step 200, the initialization is processed, and a positive terminal voltage V11 of the common terminal 15 of both resistors 13 and 14 is supplied to the microcomputer 70. At that time, the test signal Sa is staying at low level. Then, at the next step 210, whether the positive terminal voltage V11 is within a normal range or not is determined.

Because the positive terminal voltage V11 is normal if it is a value corresponding to a voltage obtained by dividing the power source voltage of the DC power source with both resistors 13 and 14, the determination at step 210 results in YES. On the other hand, if the switching element 30 is turned on erroneously, the positive terminal voltage V11 decreases approximately to a grounded potential value. Then, the determination at step 210 results in NO. Furthermore, if the squib 10 is short-circuited erroneously to the line of the DC power source, then the positive terminal voltage V11 increases approximately to a power source voltage value. Also in this case, the determination at step 210 results in NO.

At the determination at step 210, whether the switching element 20 is allowed to be turned on or not is confirmed by supplying the test signal Sa to the determination circuit 80 in the nest step 212 (that is, the malfunction of the determination circuit 80, the first drive circuit 110, and the switching element 20 is diagnosed) in the determination at step 210. Therefore, at least whether the switching element 30 is being OFF or not is confirmed. The reason of the confirmation is that an activating current is prevented from being supplied erroneously to the squib 10 as long as any one of both switching elements 30 and 40 is being OFF even though the switching element 20 is turned on for operation confirmation.

If the determination at step 210 is NO, the positive terminal voltage V11 is not in the normal range, and the alarm processing is carried out at step 211, that is, the lighting processing of the alarm light 100 is carried out. The microcomputer 70 supplies a lighting signal to the alarm light 100 from the output port 77 to turn on the alarm light 100. Thereby, the alarm light 100 is lighted for alarming the abnormality.

On the other hand, if the determination at step 210 is YES, the positive terminal voltage V11 is in the normal range, and the switching elements 30 and 40 are both being OFF. Therefore, at step 212, a high level test signal Sa is supplied from the output port 72 of the microcomputer 70 to the threshold voltage switching circuit 81 of the determination circuit 80. Simultaneously, the high level test signal Sa is supplied to the inhibition circuit 90 as an inhibition signal Sc.

When the high level test signal Sa is supplied to the threshold voltage switching circuit 81, the threshold voltage switching circuit 81 receives the test signal Sa as a signal for test mode, and the threshold voltage is switched to Vd and the voltage is supplied to the comparator 82. At that time, the first acceleration sensor 80 generates an output voltage Vc while the mechanical switch 51 is being OFF.

As a result, the comparator 82 compares the output voltage Vc with the threshold voltage Vd, and generates and supplies a high level comparison signal to the timer 83 based on the comparison result Vc>Vd. Then, the timer 83 generates a high level timer signal based on time counting and supplies it to the first drive circuit 110. Then, in the first drive circuit 110, the base of the transistor 111 receives the high level timer signal from the timer 83 through both resistors 112 and 113 to be turned on thereby, and the gate of the switching element 20 is grounded through the resistor 114.

On the other hand, when the high level test signal Sa is supplied to the inhibition circuit 90 as an inhibition signal Sc, the transistor 91 receives the inhibition signal Sc through both resistors 92 and 93 to be turned on thereby, and the gate of the switching element 30 is grounded. As a result, the switching element 30 is inhibited to be turned on. Therefore, an activating current will not be supplied to the squib 10.

When the switching element 20 is turned on in this state, a voltage Sb that develops on the common terminal 23 of both switching elements 20 and 40 increases approximately to a power source voltage of the DC power source. If the switching element 20 is not turned on due to malfunction regardless of the gate that is grounded, the voltage Sb does not increase approximately to a power source voltage value of the DC power source and is maintained at the voltage of the common terminal of both resistors 21 and 22.

After the processing at step 212, whether the voltage Sb is higher than the predetermined voltage value Vth or not is determined at step 220. Herein, the predetermined voltage value Vth is set at a value between the power source voltage of the DC power source and the normal voltage (voltage Sb occurs when the switching element 20 is turned on).

As a result, if the voltage Sb is equal to or higher than the predetermined voltage value Vth, then the YES-determination is obtained at step S220, and the turn-off (light-out) command processing of the alarm light 100 is performed at step 221. Thereby, the alarm light 100 is turned off. On the other hand, if the voltage Sb is lower than the prescribed voltage value Vth, NO-determination is obtained at step 220 because the switching element 20 is in off-malfunctioning, then the alarm light 100 is lighted for alarming at step 211.

After processing at steps 211 and 221, the test signal Sa is changed to the low level and the test mode signal that is being supplied to the determination circuit 80 is discontinued. Thus, the malfunction diagnosis is completed.

As described above, because the microcomputer 70 supplies a high level test signal Sa from the output port 72 simultaneously to the determination circuit 80 and also to the inhibition circuit 90 as an inhibition signal Sc, whether the switching element 20 is allowed to be turned on or not can be determined by the determination circuit 80 through the drive circuit 110 based on the high level test signal Sa while the switching element 30 is being OFF by means of the inhibition circuit 90 based on the inhibition signal Sc.

That is, a high level test signal Sa is used also as an inhibition signal Sc. Thereby, the output signal of the same output port of the microcomputer 70 is used as a test signal for the switching element 20 and also as an ON-inhibition signal for the switching element 30.

For example, even in the case that the output port 72 of the microcomputer 70 becomes to a state in which the computer program software cannot control the microcomputer 70 due to erroneous operation and a high level test signal Sa is supplied erroneously from the microcomputer 70 to thereby turn on the switching element 20, the switching element 30 is inhibited from being turned on by the inhibition signal Sc that is the high level test signal Sa.

As a result, even in the case that the microcomputer 70 goes into erroneous operation in the present embodiment that employs the electronic switching element as the switching element 20, an accident that an activating current is supplied erroneously to the squib 10 resulted from the state change of the output port 72 due to the erroneous operation is prevented, that is, erroneous start of the airbag device A is prevented.

Furthermore, a severer erroneous operation condition is assumed for the microcomputer 70. It is assumed that the test signal Sa is changed erroneously to a high level signal due to disturbed state of the output port 72 of the microcomputer 70 and the switching element 20 is turned on to result in the erroneous vehicle collision determination as described hereinafter. In such a case, usually the second and third drive circuits 120 and 130 turn on the respective switching elements 30 and 40. However, only the switching element 30 is maintained OFF by means of the inhibition circuit 90 based on the inhibition signal Sc that is the high level test signal Sa. Therefore, even in the case of the severer erroneous operation condition of the microcomputer 70, the erroneous start of the airbag device A is prevented surely.

When the malfunction diagnosis of the switching element 20 is completed at step 222, whether the time reaches to the control period of the microcomputer 70 or not is determined at step 230 shown in FIG. 3. Generally, the control period is set to be a period of about 1 ms. If the time does not reach to the control period, NO-determination is obtained at step 230, and the sequence goes into the waiting state.

Thereafter, when YES-determination is obtained at step 230, an acceleration detection signal of the second acceleration sensor 60 is supplied to the input port 71 of the microcomputer 70, and it is converted to the digital data. Concomitantly, the digital data is subjected to interval integration as the interval integration value at step 232. Then, at step 240, the vehicle collision is determined based on the interval integration value.

If the interval integration value IIV is equal to or larger than a predetermined value iiv, the determination that the vehicle has collided is obtained at step 240, and a built-in ON-retaining timer of the microcomputer 70 is reset and the counting time (for example, 50 ms) is started to count the time. On the other hand, the interval integration value is smaller than the predetermined value, NO-determination is obtained at step 240.

When the processing at step 241 is completed or NO-determination processing at step 240 is completed, whether the time counting value of the ON-retaining timer (on-timer) is zero or not is determined at step 250.

When the determination at step 250 is YES in the present stage, the ON-retaining timer counts the counting time in the countdown fashion. Then, both switching elements 30 and 40 are turned on at step 253. Concomitantly, the second and third drive circuits 120 and 130 turn on the respective switching elements 30 and 40. Thereafter, when the counting time value of the ON-retaining timer becomes zero, NO-determination is obtained at step 250, and both switching elements 30 and 40 are turned off at step 251. Concomitantly, the second and third drive circuits 120 and 130 turn off the respective switching elements 30 and 40.

On the other hand, if the vehicle collision is determined to be sure, the first acceleration sensor 50 generates an output voltage Va correspondingly to turning on of the mechanical switch 51. Furthermore, because the test signal Sa is being at low level at step 222, the threshold voltage switching circuit 81 supplies a threshold voltage Vb. Therefore, the comparator 82 generates a high level comparison signal based on the relation Va>Vb, and the timer 83 generates a high level timer signal.

Therefore, the first drive circuit 110 turns on the switching element 20 correspondingly to turning on of the transistor 111 based on the high level timer signal. The ON-time continues during the time while the high level timer signal generated from the timer 83 is being generated. Because the test signal Sa, namely the inhibition signal Sc, is a low level signal, the inhibition circuit 90 releases the switching element 30 from ON-inhibition since the transistor 91 is turned off.

In other words, ON-state of both switching elements 30 and 40 are maintained until the counting time value of the ON-retaining timer becomes zero, and on the other hand the counting time value is maintained during the time while the high level timer signal generated from the timer 83 is being generated. Therefore, the ON-time of both switching elements 30 and 40 is overlap with the ON-time of the switching element 20.

As a result, in the state that all the switching elements 20, 30, and 40 are ON, an activating current is supplied surely from the DC power source to the squib 10 to thereby start the airbag device A. Thereby, the airbag device A protects a passenger surely when the vehicle collides.

Because an electronic switching element is employed as the switching element 20 instead of a mechanical switching element and the mechanical switch 51 is employed for the first acceleration sensor 50 instead of an electronic switching element, it is not necessary to supply an activating current to the first acceleration sensor 50, and an activating device that is more inexpensive and small-sized than the conventional activating device can be provided.

Second Embodiment

Figure 4:
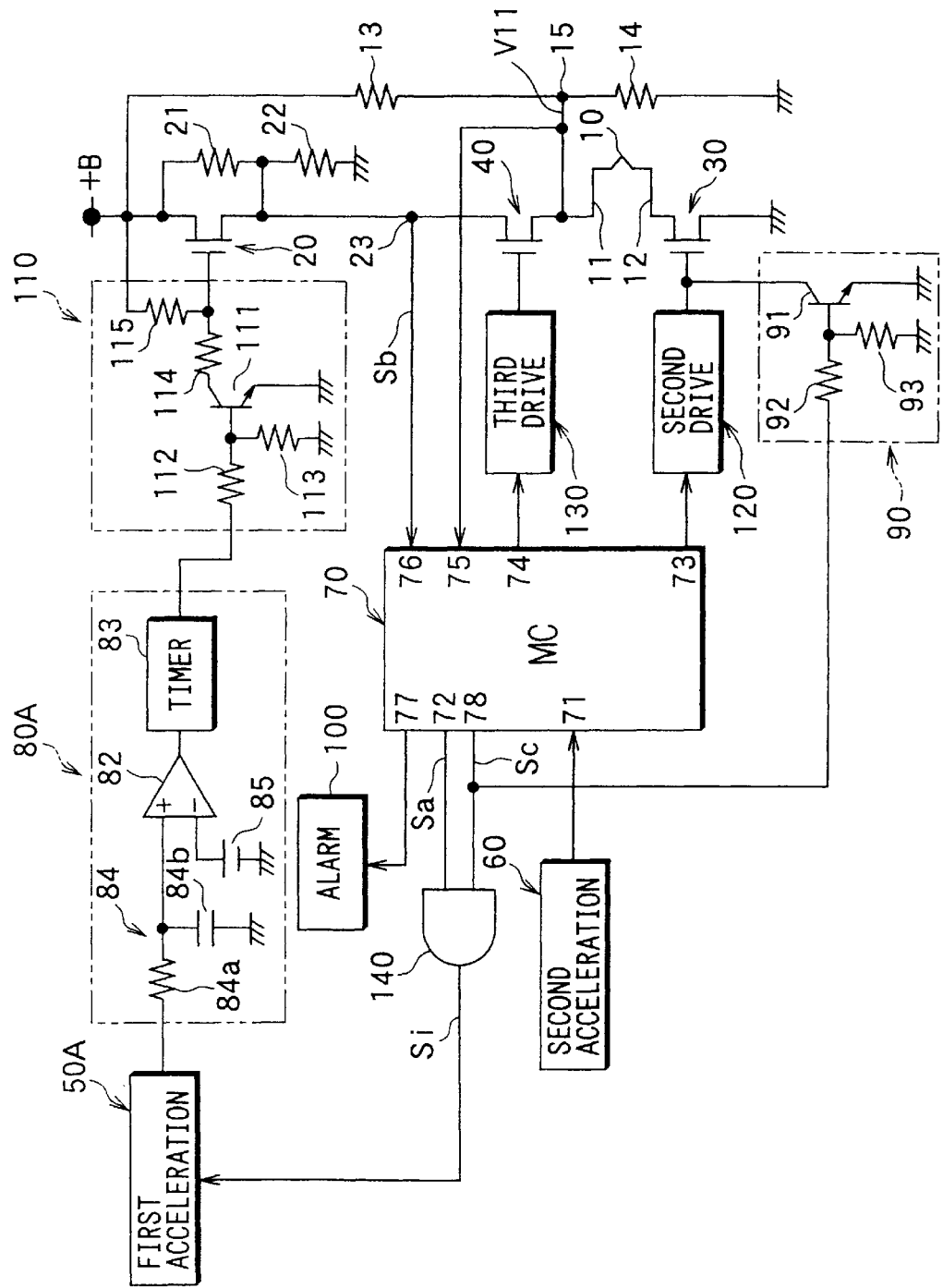
FIG. 4 is an electronic circuit diagram illustrating a second embodiment of the present invention.

FIG. 4 shows the second embodiment of the present invention. The second embodiment has the structure in which a first acceleration sensor 50A, a determination circuit 80A, and an AND gate 140 are employed instead of the first acceleration sensor 50 and the determination circuit 80 of the first embodiment.

The first acceleration sensor 50A comprises a semiconductor-type acceleration sensor, and the acceleration sensor 50A detects the acceleration of the vehicle and generates an acceleration detection signal that is proportional to the acceleration of the vehicle as an analog voltage. Furthermore, the first acceleration sensor 50A receives a high level pseudo signal generation request signal Si that is generated from the AND gate 140, and generates a pseudo signal that represents a pseudo acceleration equivalent to the collision acceleration of the vehicle.

The determination circuit 80A comprises the comparator 82 and the timer 83 as used for the determination circuit 80 in the first embodiment, a reference voltage generation circuit 85 instead of the threshold voltage switching circuit 81 of the determination circuit 80, and an additional low pass filter (LPF) 84.

The LPF 84 comprises a resistor 84a and a capacitor 84b. The LPF 84 extracts the low frequency component from an acceleration detection signal or a pseudo signal of the first acceleration sensor 50A and supplies it to the positive input terminal of the comparator 82 as a filtered acceleration voltage or a filtered pseudo voltage. The reference voltage generation circuit 85 generates a reference voltage.

The comparator 82 compares the filtered acceleration voltage or filtered pseudo voltage supplied from the LPF 84 with the reference voltage supplied from the reference voltage generation circuit 85. If the filtered acceleration voltage or the filtered pseudo voltage is higher than the reference voltage, then the comparator 82 generates a high level comparison signal that represents the actual collision or pseudo collision of the vehicle.

The one input terminal of the AND gate 140 is connected to the output port 72 of the microcomputer 70, and the other input terminal of the AND gate 140 is connected to another output port 78 of the microcomputer 70.

Thereby, the AND gate 140 receives the test signal Sa at the one input terminal thereof from the output port 72 of the microcomputer 70, and receives the inhibition signal Sc at the other input terminal thereof from the output port 78 of the microcomputer 70. When the test signal Sa and the inhibition signal Sc are both at high level, the AND gate 140 supplies a gate signal to the first acceleration sensor 50A as the high level pseudo signal generation request signal Si.

Furthermore, the inhibition circuit 70 receives the inhibition signal Sc from the microcomputer 70 through the output port 78 as in the case of the inhibition signal Sc. Other components are the same as those used in the first embodiment substantially.

In the second embodiment, if the determination at step 210 is YES as in the case described in the first embodiment, then a high level test signal Sa and a high level inhibition signal Sc are generated. Then, the AND gate 140 supplies a high level pseudo signal generation request signal Si to the first acceleration sensor 50A based on the test signal Sa and inhibition signal Sc. Therefore, when the first acceleration sensor 50A generates a pseudo signal, the LPF 84 in the determination circuit 80A generates a filtered pseudo voltage based on the pseudo signal.

Concomitantly, the comparator 82 compares the filtered pseudo voltage with the reference voltage of the reference voltage generation circuit 85 and generates a high level comparison signal. The timer circuit 83 generates a high level timer signal as in the case of the first embodiment. Therefore, the first drive circuit 110 turns on the transistor 111 based on the timer signal and the gate of the switching element 20 is resultantly grounded through the resistor 114.

On the other hand, the inhibition circuit 90 receives the inhibition signal Sc from the microcomputer 70, and inhibits the switching element 30 from being turned on by turning on the transistor 91. Therefore, an activating current will not be supplied to the squib 10.

When the switching element 20 is turned on in such state, the voltage Sb that occurs at the common terminal 23 of both switching elements 20 and 40 increases approximately to the power source voltage of the DC power source. If the switching element 20 is not turned on due to malfunction though the gate is grounded, the voltage Sb does not increase approximately to the power source voltage of the DC power source and remains at the voltage of the common terminal of both resistors 21 and 22. Therefore, whether the switching element 20 is allowed to be turned on or not is determined at step 220 to step 222 without erroneous current flow to the squib 10.

That is, even though a high level test signal Sa and a high level inhibition signal Sc are sent out from separate respective output ports of the microcomputer 70, the AND gate 140 that is provided separately from the microcomputer 70 supplies the pseudo signal generation request signal Si to the first acceleration sensor 50A based on the test signal Sa and the inhibition signal Sc and the inhibition signal Sc is supplied to the inhibition circuit 90 simultaneously. Therefore, the determination circuit 80A can determine whether the switching element 20 is allowed to be turned on or not through the driving circuit 110 while the inhibition circuit 90 is securing the switching element 30 OFF based on the inhibition signal Sc based on the pseudo signal generated from the first acceleration sensor 50A under the high level test signal Sa.

Therefore, even if the microcomputer 70 goes into erroneous operation and the test signal Sa and the inhibition signal Sc are disturbed due to disturbance of the state of output ports 72 and 78 when the switching element 20 is subjected to malfunction diagnosis, because the pseudo signal generation request signal Si supplied from the AND gate 140 becomes high level only when the test signal Sa and the inhibition signal Sc are both in high level and whether the switching element 20 is allowed to be turned on or not is determined under ON-inhibition of the switching element 30, the erroneous start of the airbag device A is prevented surely when the switching element 20 is subjected to malfunction diagnosis.

ON-inhibition of the switching element 30 is not guaranteed when the inhibition signal Sc is a low level signal. However, because the output of the AND gate 140 is also low level, the switching element 20 will not be turned on even if it is normal. Furthermore, when the inhibition signal Sc is high level and the test signal Sa is low level, the switching element 20 will not be turned on even if it is normal because the output of the AND gate 140 is low level. On the other hand the inhibition signal Sc functions through the inhibition circuit 90 so that the switching element 30 is inhibited from being turned on. Therefore, because the switching elements 20 and 30 are both maintained in OFF state, an activating current will not be supplied erroneously to the squib 10. At step 222, the test signal Sa and the inhibition signal Sc are both returned to low level, and the malfunction diagnosis routine is brought to an end.

The first acceleration sensor 50A generates the pseudo signal correspondingly to the pseudo signal generation request signal Si supplied from the AND gate 140 based on the test signal Sa and the inhibition signal Sc, and whether the switching element 20 is allowed to be turned on or not is determined by use of the pseudo signal in the second embodiment. Therefore, the switching element 20 will not be turned on when the first acceleration sensor 50A does not generate the pseudo signal. Therefore, in the second embodiment, the malfunction diagnosis is performed including the operation of the determination circuit 80A and first drive circuit 110 in the same manner as the malfunction diagnosis of the switching element 20 differently from the first embodiment.

Third Embodiment

Figure 5:
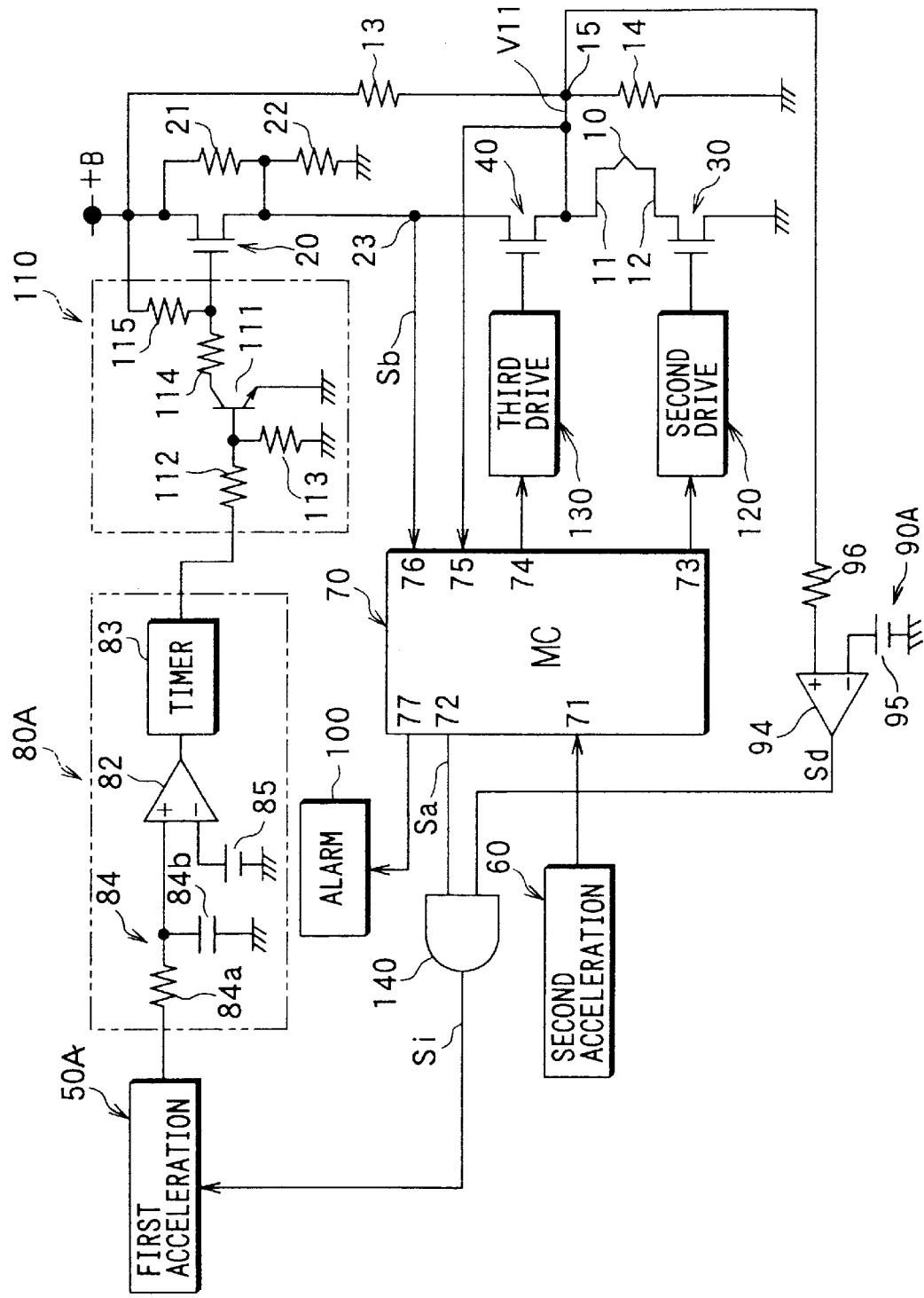
FIG. 5 is an electronic circuit diagram illustrating a third embodiment of the present invention.

FIG. 5 shows the third embodiment of the present invention. The third embodiment has the structure in which a voltage monitoring circuit 90A is employed instead of the inhibition circuit 90 that is used in the second embodiment.

The voltage monitoring circuit 90A is provided with a comparator 94, a reference voltage generation circuit 95, and a resistor 96. The reference voltage generation circuit 95 generates a voltage that is the positive terminal voltage V11 developing at the common terminal 15 of both resistors 13 and 14 having a value between the voltage that develops when the switching elements 20, 30, and 40 are turned off (normal voltage) and the grounded potential as the reference voltage.

The comparator 94 compares the positive terminal voltage V11 supplied from the common terminal 15 through the resistor 96 with the reference voltage supplied from the reference voltage generation circuit 95, generates a comparison signal as the voltage monitoring signal Sd, and supplies it to the other input terminal of the AND gate 140. Because the positive terminal voltage V11 decreases approximately to the grounded potential when the switching element 30 is ON, the voltage monitoring signal Sd becomes low level. On the other hand, because the value of the positive terminal voltage V11 is normal when the switching element 30 is OFF, the voltage monitoring signal Sd becomes high level.

The AND gate 140 receives the test signal Sa supplied from the output port 72 of the microcomputer 70 and the voltage monitoring signal Sd supplied from the comparator 94 to thereby generate a gate signal. The gate signal is supplied to the first acceleration sensor 50A as the high level pseudo signal generation request signal Si when the test signal Sa and the voltage monitoring signal Sd are both high level.

In the third embodiment, when a high level test signal Sa is generated from the microcomputer 70 at step 212 (FIG. 2), the AND gate 140 supplies a high level pseudo signal generation request signal Si to the first acceleration sensor 50A if the comparator 94 generates a high level voltage monitoring signal Sd because the positive terminal voltage V11 is normal.

Herein, the description that the positive terminal voltage V11 is normal means OFF state of the switching element 30. Therefore, in such a state, the malfunction diagnosis of circuit elements including from the first acceleration sensor 50A to the switching element 20 are performed based on the high level pseudo signal generation request signal Si generated from the AND gate 140 in the same manner as performed in the case of the second embodiment.

On the other hand, if the switching element 30 is erroneously turned on because the positive terminal voltage V11 is abnormal, the output of the comparator 94 is in low level and the output of the AND gate 140 is concomitantly in low level also. As a result, the first acceleration sensor 50A does not generate a high level pseudo signal, and the switching element 20 is not turned on if it is normal.

Also in the case of the third embodiment having the structure in which the voltage monitoring circuit 90A instead of the inhibition circuit 90 described in the second embodiment is connected between the AND gate 140 and the common terminal 15, the voltage monitoring signal Sd becomes low level when the switching element 30 is ON. Therefore, when a high level test signal Sa is generated erroneously due to erroneous operation of the microcomputer 70, the output of the AND gate 140 is maintained in low level because the switching element 30 is ON. As a result, the erroneous operation of the microcomputer 70 does not cause the erroneous activation of the airbag device A.

Fourth Embodiment

Figure 6:
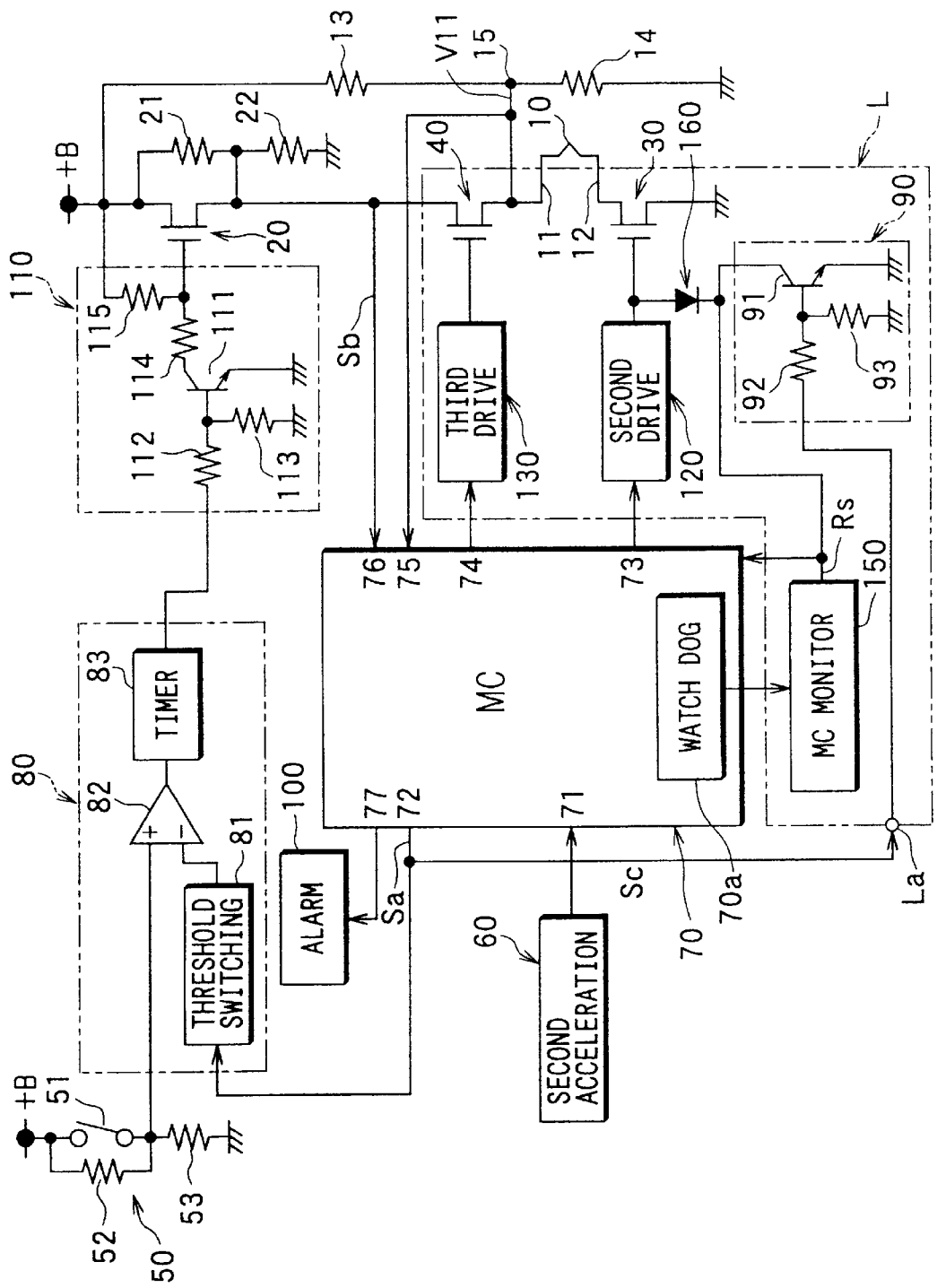
FIG. 6 is an electronic circuit diagram illustrating a fourth embodiment of the present invention.

FIG. 6 shows the fourth embodiment of the present invention. In the fourth embodiment, the microcomputer 70 is provided with a watch dog pulse output circuit 70a. The watch dog pulse output circuit 70a generates the watch dog pulse periodically when the microcomputer 70 is operated normally. The watch dog pulse output circuit 70a discontinues the generation of the watch dog pulse when the computer program that is software is not processed by normal route within a predetermined time due to erroneous operation of the microcomputer 70.

Furthermore, in the fourth embodiment, a microcomputer monitoring circuit 150 and an inhibition circuit 160 are provided additionally to the first embodiment. When the microcomputer monitoring circuit 150 cannot detect the watch dog pulse generated from the watch dog pulse output circuit 70a within the predetermined period, the microcomputer monitoring circuit 150 generates a low level reset signal Rs during a predetermined time period and supplies it to the microcomputer 70 to thereby reset the microcomputer 70.

The anode of the inhibition circuit 160 that is a diode is connected to the gate of the switching element 30, and the cathode of the inhibition circuit 160 is connected to the collector of the transistor 91 of the inhibition circuit 90 and to the output terminal of the microcomputer monitoring circuit 150. Thereby, the inhibition circuit 160 becomes conductive when the microcomputer monitoring circuit 150 generates a reset signal Rs or the transistor 91 is turned on, and the switching element is inhibited from being turned on. On the other hand, the inhibition circuit 160 is nonconductive when the microcomputer monitoring circuit 150 is not generating a reset signal Rs or the transistor 91 is OFF.

Furthermore, in the fourth embodiment, the second and third switching elements 30 and 40, the second and third drive circuits 120 and 130, both inhibition circuits 90 and 160, and the microcomputer monitoring circuit 150 are integrated in a single IC chip L. A port for supplying the inhibition signal Sc generated from the microcomputer 70 to the inhibition circuit 90 is provided on the IC terminal La of the IC chip L.

In the fourth embodiment, a high level test signal Sa is generated from the microcomputer 70 at step 212 (FIG. 2), and the test signal Sa is supplied to the base of the transistor 91 through the IC terminal La of the IC chip L and the resistor 92 as the inhibition signal Sc. As a result, the transistor 91 is turned on and the cathode of the inhibition circuit 160 is grounded.

Concomitantly, the conduction of the inhibition circuit 160 inhibits the switching element 30 from being turned. Therefore, when the determination circuit 80 determines whether the switching element 20 is allowed to be turned on or not through the first drive circuit 110 based on the test signal Sa, an activating current will not be supplied to the squib 10 erroneously. As a result, the switching element 20 is subjected to malfunction diagnosis without erroneous start of the airbag device A.

Furthermore, the second and third switching elements 30 and 40, the second and third drive circuits 120 and 130, both inhibition circuits 90 and 160, and the microcomputer monitoring circuit 150 are integrated in the signal IC chip L, and the IC terminal La is served as the input port for receiving the inhibition signal Sc supplied from the microcomputer 70.

Therefore, the switching elements 30 and 40, the second and third drive circuits 120 and 130, both inhibition circuits 90 and 160, and the microcomputer monitoring circuit 150 are formed so as to achieve the function with only the wiring on the IC chip L as a result of integration of these components into IC. The integration brings about the cost advantage.

Fifth Embodiment

Figure 7:
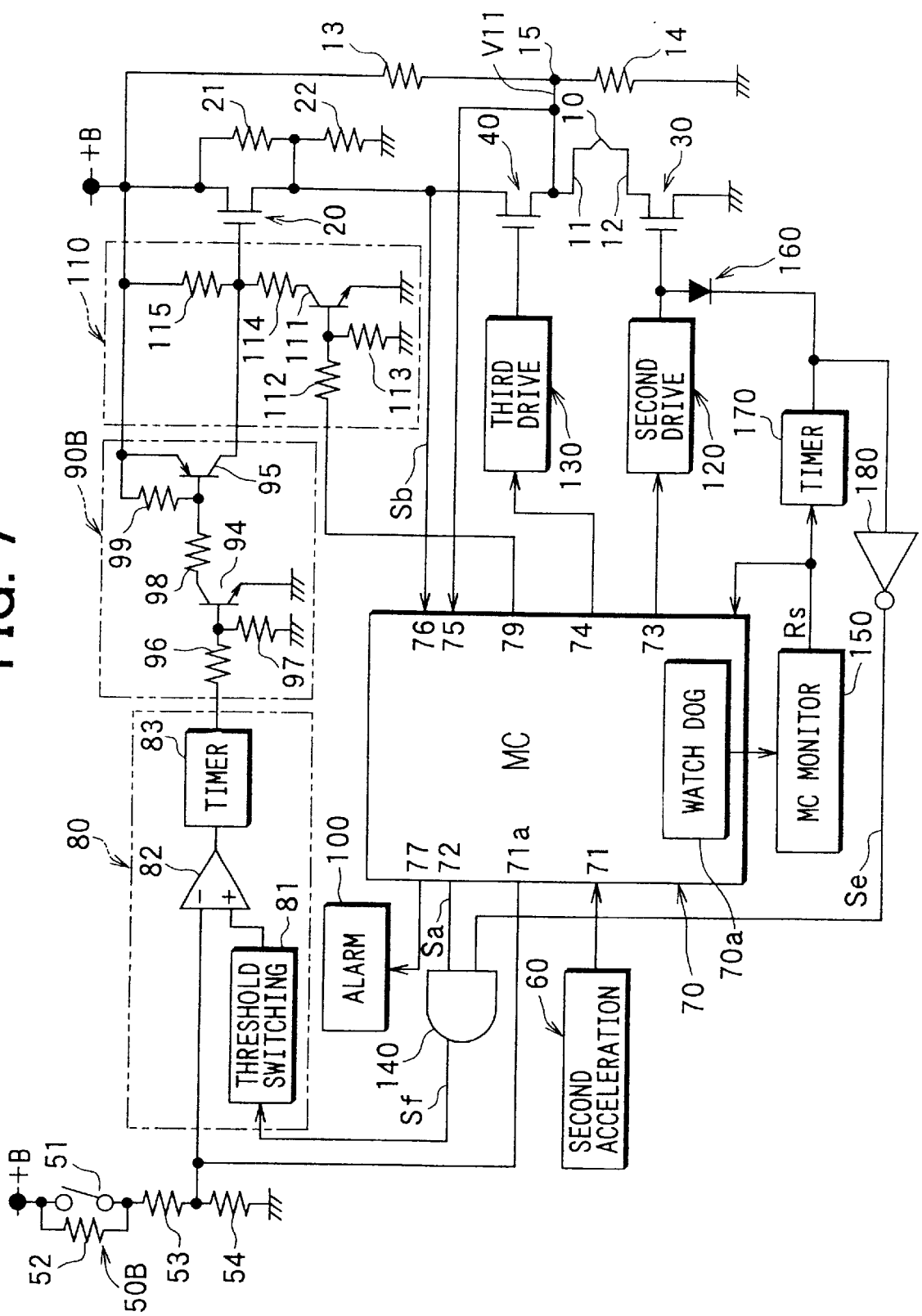
FIG. 7 is an electronic circuit diagram illustrating a fifth embodiment of the present invention.

FIG. 7 shows the fifth embodiment of the present invention. In the fifth embodiment, a first acceleration sensor 50B and an inhibition circuit 90B are employed instead of the first acceleration sensor 50 and the inhibition circuit 90 (refer to FIG. 6) employed in the fourth embodiment.

The first acceleration sensor 50A has the structure in which the resistor 52 is grounded through the resistor 54 and the common terminal of both resistors 53 and 54 is connected to the negative input terminal of the comparator 81 and another input port 71a of the microcomputer 70 differently from the first acceleration sensor 50 used for the fourth embodiment.

Thereby, the first acceleration sensor 50B divides the power voltage of the DC power source with both resistors 52 and 53 when the mechanical switch 51 is OFF, and supplies the resultant divided voltage to the negative input terminal of the comparator 81 and another input port 71a of the microcomputer 70 from the common terminal of both resistors 53 and 54 as the output voltage Vc'. This output voltage Va' corresponds to the output voltage Vc of the acceleration sensor 50 in the fourth embodiment.

Furthermore, the first acceleration sensor 50B divides the power source voltage of the DC power source with the resistors 53 and 54 when the mechanical switch 51 is ON, and supplies the resultant divided voltage from the common terminal of both resistors 53 and 54 to the negative input terminal of the comparator 81 and an other input port 71a of the microcomputer 70 as the output voltage Va'. This voltage Va' corresponds to the output voltage Va of the acceleration sensor 50 in the fourth embodiment). Herein, Va'>Vb>Vc'>Vd.

The inhibition circuit 90B is connected between the first drive circuit 110 and the determination circuit 80. However, in the fifth embodiment differently from the fourth embodiment, the base of the transistor 114 of the first drive circuit 110 is connected to another output port 79 of the microcomputer 70 through the resistor 112. Th common terminal of the mechanical switch 51 of the first acceleration sensor 50 and the resistor 53 is connected to another input port 71a of the microcomputer 70.

The inhibition circuit 90B is provided with an NPN-type transistor 94 and a PNP-type transistor 95, and resistors 96 to 99. The base of the transistor 94 is connected to the output terminal of the timer 83 of the determination circuit 80 through both resistors 96 and 97. The transistor 94 is biased through both resistors 96 and 97 by means of a high level signal supplied from the timer 83 and turned on. Furthermore, when the timer signal supplied from the timer 83 is in low level, the transistor 94 remains in OFF state.

The base of the transistor 95 is connected to the collector of the transistor 94 through the resistor 98, and the resistor 99 is connected between the base and the collector of the transistor 95. Furthermore, the emitter of the transistor 95 is connected to the common terminal of both resistor 115 and 114 of the first drive circuit 110 and the gate of the switching element 20, and the collector of the transistor 95 is connected to the positive terminal +B of the DC power source.

Thereby, the transistor 95 is turned on based on the ON-operation of the transistor 94 and short-circuits the resistor 115, and short-circuits the gate and source of the switching element 20. Furthermore, when the transistor 94 is OFF, the transistor 95 is turned off and releases the short-circuit of the resistor 115 and the short-circuit of the gate and the source of the switching element 20. Thus, the inhibition circuit 90B approximately equalizes the gate voltage of the switching element 20 to the power source voltage of the DC power source correspondingly to ON-state of the transistor 95 to thereby inhibit the switching element 20 from being turned on, and the ON-inhibition is released by turning off the transistor 95.

Furthermore, in the fifth embodiment, the AND gate 140 (FIG. 5) is employed, and a timer 170 and an inverter 180 are additionally employed. The timer 170 is connected between the output terminal of the microcomputer monitoring circuit 150 (FIG. 6) and the cathode of the inhibition circuit 160, the timer 170 counts the predetermined counting time based on the low level reset signal Rs supplied from the microcomputer monitoring circuit 150 and generates a low level timer signal during the counting time.

That is, the timer 170 holds the low level reset signal Rs supplied from the microcomputer monitoring circuit 150 as the low level timer signal during the predetermined counting time. Thereby, the timer 170 grounds the cathode of the inhibition circuit 160 while the timer signal is being generated. Thus, the inhibition circuit 160 is conductive while the timer 170 is generating the timer signal to thereby inhibit the switching element 30 from being turned on.

The inverter 180 inverts the low level timer signal supplied from the timer 170 and thereby generates a high level inversion signal Se. The inversion signal Se becomes low level when the timer signal of the timer 170 becomes high level.

The one input terminal of the AND gate 140 is connected to the output port 72 of the microcomputer 70, and the other input terminal of the AND gate 140 is connected to the output terminal of the inverter 180. Thereby, the AND gate 140 receives the high level test signal Sa supplied from the microcomputer 70 and the high level inversion signal Se of the inverter 180 and supplies a high level gate signal Sf to the threshold voltage switching circuit 81 of the determination circuit 80. Furthermore, the gate signal Sf becomes low level correspondingly to the change of at least one of the test signal Sa and the gate signal Se to a low level signal.

Herein, the gate signal Sf takes the same role as that of the test signal Sa that is supplied to the threshold voltage switching circuit 81 used in the fourth embodiment. Therefore, the threshold voltage of the threshold voltage switching circuit 81 is switched correspondingly to the level of the gate signal Sf as in the case of the fourth embodiment in which the threshold voltage is switched correspondingly to the level of the test signal Sa.

Furthermore, in the fifth embodiment, because the inhibition circuit 90B is connected between the first drive circuit 110 and the determination circuit 80, the positive input terminal of the comparator 81 is connected to the output terminal of the threshold voltage switching circuit 81 and the negative input terminal of the comparator 81 is connected to the common terminal of both resistors 53 and 54 of the first acceleration sensor 50B differently from the case of the fourth embodiment.

Thereby, the comparator 82 compares the output voltage Vc of the first acceleration sensor 50B with the threshold voltage Vd of the threshold voltage switching circuit 81, and generates a low level comparison signal based on the relation Vc'>Vd during the test mode. Furthermore, if the mechanical switch 51 is OFF during non-test mode, the comparator compares the output voltage Vc' of the first acceleration sensor 50B with the threshold voltage vb of the threshold voltage switching circuit 81, and generates a high level comparison signal based on the relation Vc'<Vb. When the mechanical switch 51 is turned on during non-test mode, the comparator 82 compares the output voltage Va' of the first acceleration sensor 50B with the threshold voltage Vb of the threshold voltage switching circuit 81, and generates a low level comparison signal based on the relation Va'>Vb.

Therefore, the timer 83 generates a high level signal based on the high level output of the comparator 82 and turns on the transistor 94 to thereby inhibit the switching element 20 from being turned on. The timer 83 starts to count the time based on the low level output of the comparator 82 and generates a low level timer signal at the time when the time counting starts, and the transistor 94 is resultantly turned off and ON-inhibition of the switching element 20 is released.

Concomitantly with the switching of the threshold voltage in the threshold voltage switching circuit 81, the determination time of the determination circuit 80, that is, the test mode time, is limited during the time counting of the timer 170 after reset signal generation from the microcomputer monitoring circuit 150. In the fifth embodiment, the components are not integrated in the semiconductor chip L differently from the fourth embodiment.

Figure 8:
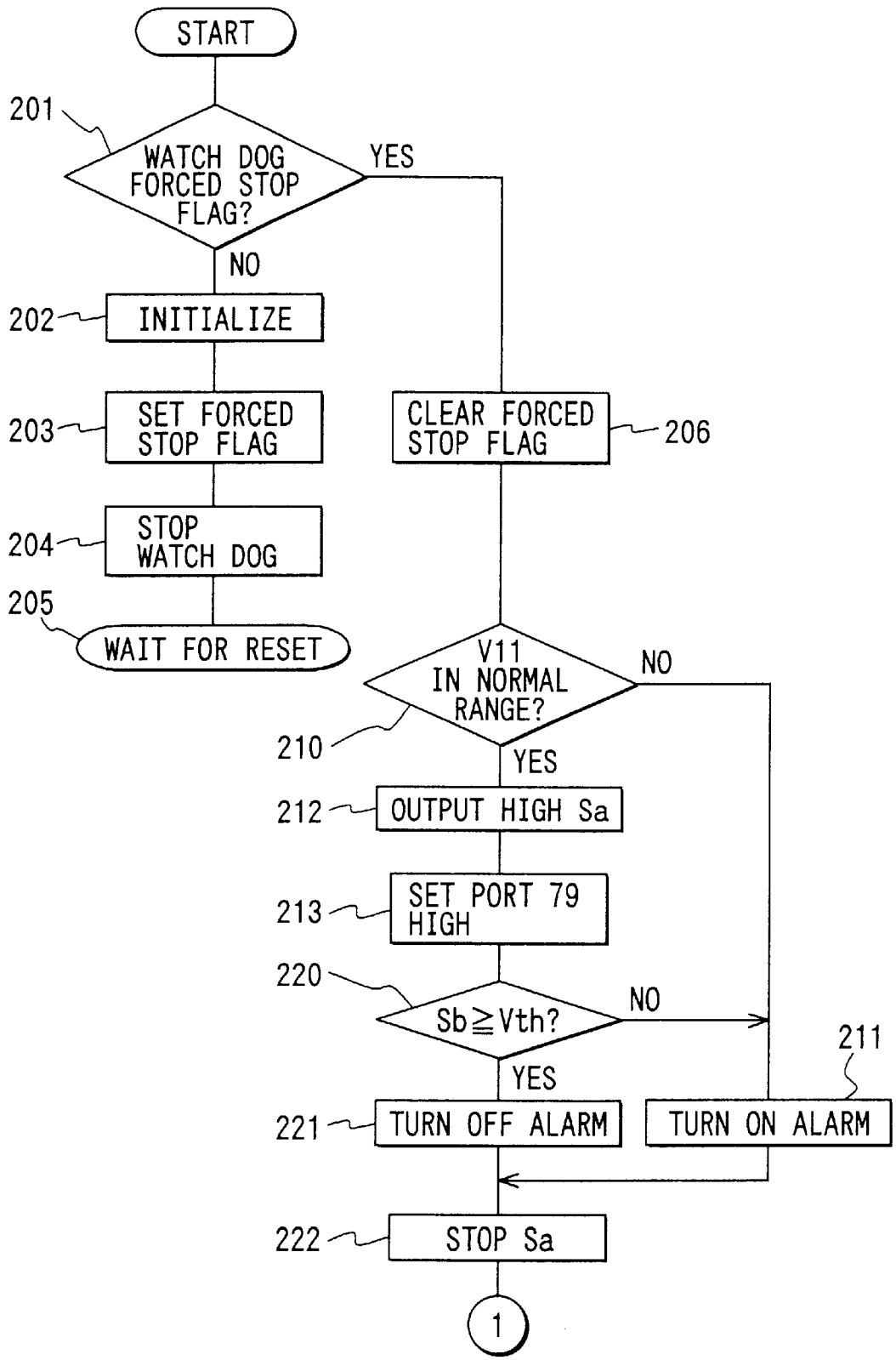
FIG. 8 is a part of a flow chart illustrating the operation of a microcomputer used in the fifth embodiment.
Figure 9:
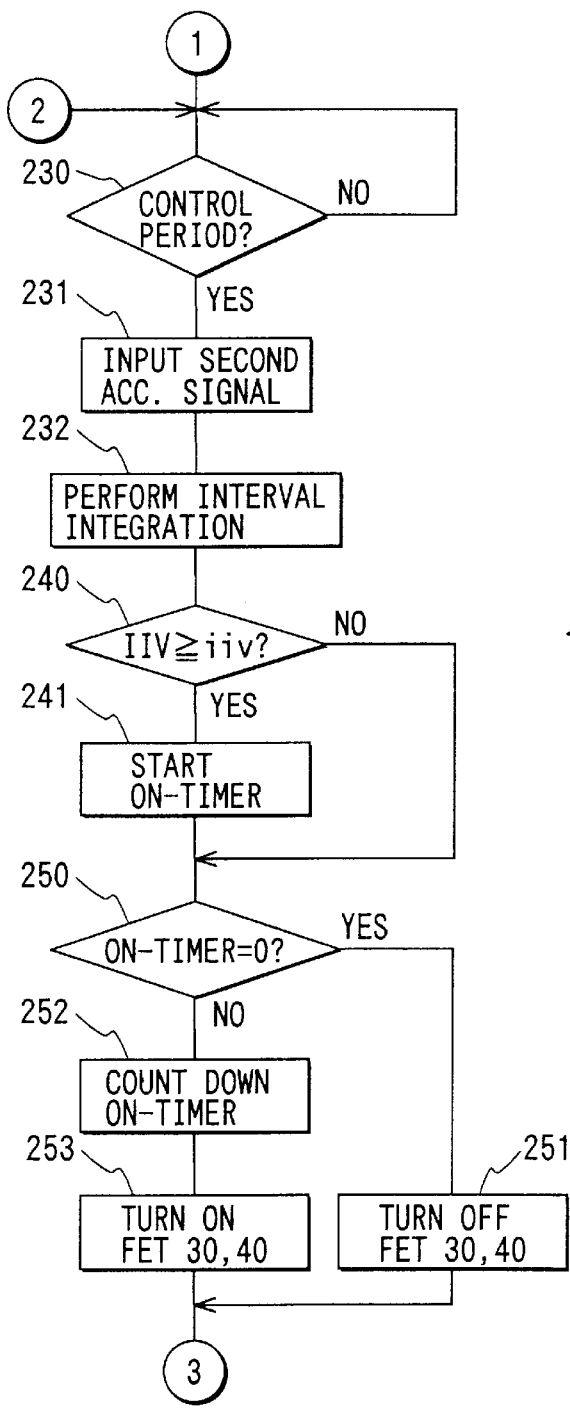
FIG. 9 is another part of a flow chart illustrating the operation of the microcomputer used in the fifth embodiment.
Figure 10:
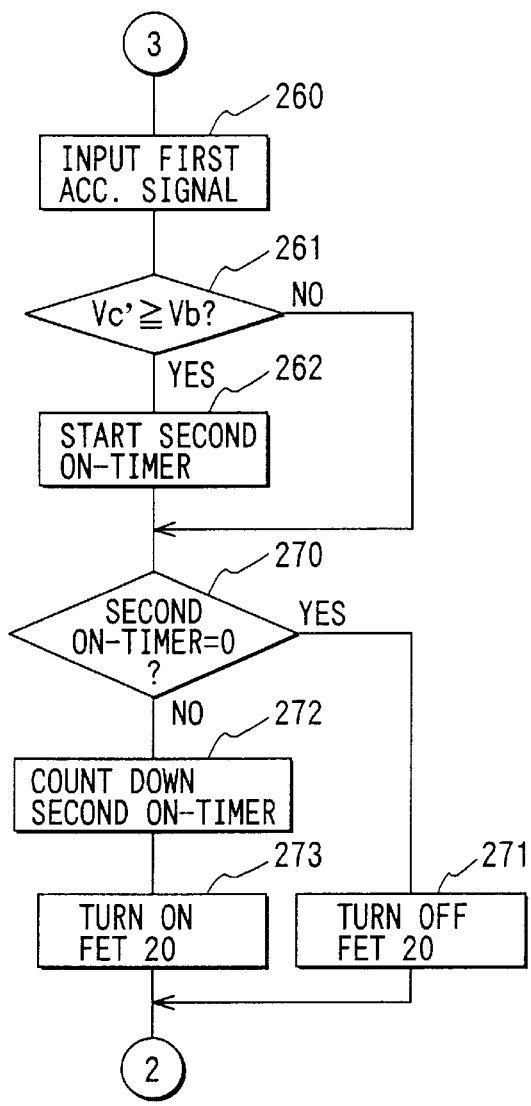
FIG. 10 is a further part of a flow chart illustrating the operation of the microcomputer used in the fifth embodiment.

In the fifth embodiment, the microcomputer 70 executes the computer program according to the flow charts shown in FIG. 8, FIG. 9 and FIG. 10. At first, at step 201, whether a watch dog pulse forced stop flag is set or not is determined. If the watch dog pulse forced stop flag is not set and NO-determination is obtained, then initialization is performed at step 202, the watch dog pulse forced stop flag is set at step 203, and the watch dog pulse is forcedly stopped at step 204. Thereafter, the microcomputer monitoring circuit 150 waits for generation of a reset signal Rs at step 205.

When a reset signal RS is generated in this state, the sequence starts again from step 201. At that time, if the watch dog pulse forced stop flag has been set, YES-determination is obtained, and the watch dog pulse forced stop flag is reset at step 206. The processing of step 210 and following steps are performed.

The processing from step 210 to step 222 is different from the processing shown in FIG. 2 in that the step 213 is added between step 212 and step 220. A high level test signal Sa is generated from the microcomputer 70 at step 212, and the test signal Sa is supplied to the AND gate 140. Furthermore, the microcomputer 70 generates a high level output from the output port 79 at step 213. As a result, the transistor 111 is turned on and the gate of the switching element 20 is grounded through the resistor 114.

On the other hand, the timer 170 starts to count the time based on the low level output concomitantly with generation of a reset signal Rs, generates a low level signal at the time of operation starting, and supplies it to the inhibition circuit 160 and the inverter 180. The time counting time of the timer 170 (low level retention time) is set to be longer than the processing time for performing the process of from step 206 to step 222.

As a result, the diode that is served as the inhibition circuit 160 becomes conductive during the generation of the low level timer signal supplied from the timer 170 based on the low level timer signal, and the switching element 30 is prevented from being turned on. Furthermore, the inverter 180 generates a high level inversion signal Se during the generation of the low level timer signal supplied from the timer 170 based on the low level timer signal, and supplies the high level inversion signal Se to the AND gate 140.

The high level test signal Sa and the high level inversion signal Se are supplied to the AND gate 140, the AND gate 140 supplies the high level gate signal Sf to the threshold voltage switching circuit 81. Concomitantly, the threshold voltage switching circuit 81 switches the threshold voltage to the value of Vd based on the high level gate signal Sf as in the case of the fourth embodiment in which the high level test signal Sa involves.

At that time, the first acceleration sensor 50 generates an output voltage Vc' in the state that the mechanical switch 51 is OFF. As a result, because of the relation Vc'>Vd, the output of the comparator 81 becomes low level, and the output of the timer 83 becomes low level. Therefore, the inhibition circuit 90B releases the switching element 20 from ON-inhibition based on the state that both transistors 94 and 95 are OFF.

Therefore, when the gate of the switching element is grounded by means of the transistor 111, because the ON-inhibition of the switching element 20 is released, the switching element 20 is turned on if it is normal. At that time, because the switching element 30 is in the state of ON-inhibition, an activating current will not flow to the squib 10 even if the switching element 20 is turned on. As a result, the switching element 20 is subjected to malfunction diagnosis without erroneous start of the airbag device A.

After completion of processing at step 222, the sequence proceeds based on the flow chart shown in FIG. 9 and FIG. 10. FIG. 9 is different from FIG. 3 in that step 260 to step 273 are added following the step 253 in the flow chart of FIG. 3.

The output voltage of the first acceleration sensor 50B is supplied at step 260 (FIG. 10) and converted to a digital data, the digital data is compared with the digital value that is equivalent to the threshold voltage Vb of the threshold voltage switching circuit 81 of the determination circuit 80 at step 261 to thereby perform collision determination of the vehicle.

Herein, because the output voltage Va' is generated from the first acceleration sensor 50B if the mechanical switch 51 of the first acceleration sensor 50B is in the state of ON, the converted digital data value is larger than the digital value that is equivalent to Vb and the collision determination of the vehicle is obtained. A built-in second ON retention timer in the microcomputer 70 starts to be reset at step 262 and starts to count the counting time (for example, 50 ms).

On the other hand, if the mechanical switch 51 of the first acceleration sensor 50B is in the state of OFF, the output voltage generated from the first acceleration sensor 50B becomes Vc', the value of the converted digital data is smaller than a digital value that is equivalent to Vb, NO-determination is obtained at step 261, and the second ON retention timer is not started.

After the processing at step 262 or NO-determination processing at step 261 is obtained, whether the time counting value of the second ON retention timer is zero or not is determined at step 270.

If YES-determination is obtained at step 270 in the present stage, the second ON retention timer counts the counting time in countdown fashion. Then, the switching element 20 is turned on at step 273. Concomitantly, the transistor 111 of the first drive circuit 110 is turned on, and indicates to the switching element 20 to be turned on. Herein, because the mechanical switch 51 of the first acceleration sensor 50B is in the state of ON and ON-inhibition of the switching element 20 applied by means of the inhibition circuit 90B is released, the switching element 20 is turned on.

Thereafter, when the time counting value of the ON retention timer becomes zero, NO-determination is obtained at step 270, and the switching element 20 is turned off at step 271. Concomitantly, the first drive circuit 110 turns off the switching element 20.

As a result, all the switching elements 20, 30, and 40 are turned on, an activating current flows to the squib 10 thereby, and the airbag device A is activated to protect a passenger.

In the fifth embodiment, because the inhibition circuit of the switching element 20 is provided, the activating device that is not activated erroneously due to erroneous operation of the microcomputer 70 even when the switching element 20 is not involved in malfunction diagnosis is provided.

In implementing the present invention, the determination circuit 80 may have the structure provided with software that performs the function as that of the determination circuit by use of a microcomputer other than the microcomputer 70. In this case, the software may be changed so that the separate microcomputer performs the same function as that of the AND gate 140.

Furthermore, the switching element 20 may be connected at the position nearer to the ground side than the switching element 30, or may be connected between both switching elements 30 and 40.

Furthermore, the switching elements 20 and 40 may be a PNP-type transistor, and the switching element 30 may be a NPN-type transistor. The switching elements 20 and 40 may be N-channel-type field effect transistor or NPN-type transistor. In this case, the first drive circuit 110 and the third drive circuit 140 are the drive circuit for N-channel-type field effect transistor or NPN-type transistor.

Furthermore, the switching element 40 and the third drive circuit 140 may be omitted.

Furthermore, not only the switching element 30 but also the switching element 40 may be assigned as the ON-inhibition target switching element when the switching element 20 is subjected to malfunction diagnosis.

Furthermore, the positive terminal of the DC power source may be the positive terminal of a vehicle battery, or may be the output terminal of a voltage rising circuit for elevating the positive terminal voltage of a battery.

Furthermore, the first and second acceleration sensors may be incorporated in a single control unit. Furthermore, an output of the acceleration sensor may be a coded serial signal.

Furthermore, in the case that the microcomputer 70 supplies a coded serial signal to the second drive circuit 110 and the second drive circuit 110 turns on the second switching element 30 based on the coincidence between the serial signal and a predetermined code, a decoder circuit may be employed as the second drive circuit 110.

Furthermore, in the case that the microcomputer 70 supplies a coded serial signal to the second drive circuit 120 and the second drive circuit 120 turns on the switching element 30 based on the coincidence between the serial signal and a predetermined code, a decoder circuit as the second drive circuit 120. The same is true for the third drive circuit 130.

In the case that the decoder circuit is employed instead of the second drive circuit 120 or the third drive circuit 130 with using the serial signal of the microcomputer 70, the structure in which the inhibition circuit 90 is integrated in the IC chip L in the integration of the fourth embodiment (FIG. 6) and the switching element 30 or 40 is forcedly turned off brings about the great advantage for prevention of erroneous start due to erroneous operation of the microcomputer 70.

For example, the inhibition circuit 90 is located outside the IC chip L, the resistor is interpolatively connected between the output port 73 of the microcomputer 70 and the second drive circuit 120, the collector of the transistor 91 of the inhibition circuit 90 is connected to the second drive circuit side of the resistor, and the output port 73 is grounded based on the turning on of the transistor 91. In this state, because the predetermined serial signal is not supplied to the second drive circuit 120, the switching element 30 that is now in OFF is prevented from being turned on.

However, in the state that the switching element 30 has been erroneously turned on due to erroneous operation of the microcomputer 70, when a test signal Sa is erroneously supplied and the transistor 91 of the inhibition circuit 90 is turned on based on Se that is a common signal, the inhibition circuit 90 cannot forcedly turns off the switching element 30 immediately. The reason is that the switching element 30 cannot be forcedly turned off until the second drive circuit supplies a serial signal for indicating OFF operation or a reset signal Rs of the microcomputer monitoring circuit 150 is supplied. Actually, when an activating current flows to the squib for only several $\mu$s, the airbag device A is activated. However, it is difficult to supply the serial signal for indicating OFF operation or to generate the reset signal Rs within several $\mu$s. Therefore, the ON-inhibition means that cannot turns off the switching element 30 is less advantageous in erroneous start prevention.

The structure in which the inhibition circuit 90 is located outside the IC chip L and the gate of the switching element 30 is located on the IC terminal so that the gate of the switching element 30 is controlled externally from the outside of the IC chip can function to turn off the switching element 30 immediately. However, when a plurality of squib activating circuits are provided on one IC chip, a plurality of gates of the switching element corresponding to the number of activating circuits are required. For example, four squib activating circuits are formed in the same IC chip, a plurality of gate terminals of the switching element corresponding to the four circuits are required, and the increased number of circuits results in the increased number of terminals of the IC chip.

In such case that a plurality of squib activating circuits are to be incorporated in one IC chip, the inhibition circuit 90 is incorporated in the IC chip as in the case of the fourth embodiment, for example, a plurality of diodes corresponding to the number of squib activating circuits are provided, anodes of the respective diodes are connected to each gate of the switching element of the plural squib activating circuits, cathodes of the respective diodes are connected commonly to the collector of the transistor 91 of the inhibition circuit 90. Thereby, the switching element of all activating circuits can be forcedly turned off immediately, and the object is achieved easily at inexpensive cost.

Furthermore, the structure in which the switching elements 30 and 40, the second and third drive circuit 120 and 130, the microcomputer monitoring circuit 150, the timer 170, the inverter 180, and the inhibition circuit 160 are integrated in one IC chip and the output (Se) line of the inverter is formed on the IC terminal as in the case of the fourth embodiment may be employed in the fifth embodiment (FIG. 7). Such a structure brings about an inexpensive voltage monitoring circuit for monitoring the ON-state of the switching element 30.

Furthermore, the present invention can be applied not only to an activating device of an airbag device of a vehicular airbag system but also to an activating device of a protection device of a passenger protection system such as vehicular belt pretensioner or the like and an activating device of a protection device of a general vehicular passenger protection system.

What is claimed is:

1. An activating device of a vehicular passenger protection system comprising:
    a squib for activating a passenger protection device of a passenger protection system mounted on a vehicle in response to of an activating current;
    a plurality of electronic switching elements connected in series each other with the squib between a positive terminal and a negative terminal of a power source for supplying the activating current from the power source to the squib when turned on, the electronic switching elements including a diagnosis target switching element a non-diagnosis target switching element;
    a first acceleration sensor for detecting acceleration of the vehicle;
    a second acceleration sensor for detecting the acceleration of the vehicle;
    first determination means for determining whether the vehicle has collided based on at least a detection output of the first acceleration sensor;
    second determination means provided independently of the first determination means as a hardware having a microcomputer for determining whether the vehicle has collided based on at least the detection output of the second acceleration sensor;
    drive means for driving the diagnosis target switching element to be turned on based on at least a vehicle collision made by the first determination means and for driving remaining electronic switching elements to be turned on based on at least a determination of vehicle collision made by the microcomputer;
    diagnosis means for diagnosing whether the diagnosis target switching element is in malfunction based on at least a diagnosis signal of the microcomputer; and
    concurrent operation inhibition means located outside the microcomputer for inhibiting concurrent ON-state of the diagnosis target switching element with ON-state of the non-diagnosis target switching element,
    wherein the concurrent operation inhibition means inhibits the concurrent ON-state of the diagnosis target switching element with the ON-state of the non-diagnosis target switching element regardless of an output state of the microcomputer.

2. An activating device of a vehicular passenger protection system comprising:
    a squib for activating a passenger protection device of a passenger protection system mounted on a vehicle in response to an activating current;
    a plurality of electronic switching elements connected in series each other with the squib between a positive terminal and a negative terminal of a power source for supplying the activating current from the power source to the squib when turned on, the electronic switching elements including a diagnosis target switching element and a non-diagnosis target switching element;
    a first acceleration sensor for detecting acceleration of the vehicle;
    a second acceleration sensor for detecting the acceleration of the vehicle;
    first determination means for determining whether the vehicle has collided based on at least a detection output of the first acceleration sensor;
    second determination means provided independently of the first determination means as a hardware having a microcomputer for determining whether the vehicle has collided based on at least the detection output of the second acceleration sensor;
    drive means for driving at least the diagnosis target switching element to be turned on based on at least a determination of vehicle collision made by the first determination means and for driving remaining electronic switching elements to be turned on based on at least the determination of the vehicle collision made by the microcomputer;
    diagnosis means for diagnosing whether the diagnosis target switching element is in malfunction; and
    inhibition means for inhibiting ON-state of the non-diagnosis target switching element, wherein the microcomputer generates a diagnosis signal when the diagnosis means performs diagnosis, wherein the diagnosis means performs the diagnosis based on the diagnosis signal, and wherein the inhibition means performs ON-inhibition of the non-diagnosis target switching element by commonly using the diagnosis signal.

3. An activating device of a vehicular passenger protection system comprising:

a squib for activating a passenger protection device of a passenger protection system mounted on a vehicle in response to in-flow of an activating current;

a plurality of electronic switching elements connected in series each other with the squib between the positive terminal of a power source and the negative terminal that supply the activating current from the power source to the squib when being turned on, the electronic switching elements including a diagnosis target switching element and a non-diagnosis switching element;

a first acceleration sensor for detecting acceleration of the vehicle;

a second acceleration sensor for detecting the acceleration of the vehicle;

first determination means for determining whether the vehicle has collided based on at least a detection output of the first acceleration sensor;

second determination means provided independently of the first determination means as a hardware having a microcomputer for determining whether the vehicle has collided based on at least the detection output of the second acceleration sensor;

drive means for driving the diagnosis target switching element to be turned on based on at least a determination of vehicle collision made by the first determination means and for driving remaining electronic switching elements to be turned on based on at least the determination of vehicle collision made by the microcomputer;

diagnosis means for diagnosing whether the diagnosis target switching element is in malfunction;

inhibition means for inhibiting ON-state of at least the non-diagnosis target switching element; and processing means provided independently of the microcomputer for processing a diagnosis signal for the diagnosis target switching element and an ON-inhibition signal for the non-diagnosis target switching element as an AND signal, wherein the microcomputer generates the diagnosis signal and the ON-inhibition signal when the diagnosis means performs diagnosis, wherein the diagnosis means performs the diagnosis based on the AND signal, and wherein the inhibition means performs ON-inhibition of the non-diagnosis target switching element based on the ON-inhibition signal.

4. An activating device of a vehicular passenger protection system comprising:

a squib for activating a passenger protection device of a passenger protection system mounted on a vehicle in response to an activating current;

a plurality of electronic switching elements connected in series each other with the squib between a positive terminal and a negative terminal of a power source for supplying the activating current from the power source to the squib when turned on, the electronic switching elements including a diagnosis target switching element and a non-diagnosis target switching element;

a first acceleration sensor for detecting acceleration of the vehicle;

a second acceleration sensor for detecting the acceleration of the vehicle;

first determination means for determining whether the vehicle has collided based on at least a detection output of the first acceleration sensor;

second determination means provided independently of the first determination means as a hardware having a microcomputer for determining whether the vehicle has collided based on at least the detection output of the second acceleration sensor;

drive means for driving the diagnosis target switching element to be turned on based on at least a determination of vehicle collision made by the first determination means and for driving remaining electronic switching elements to be turned on based on at least the determination of vehicle collision made by the microcomputer;

diagnosis means for diagnosing whether the diagnosis target switching element is in malfunction;

inhibition means for inhibiting ON-state of at least the non-diagnosis target switching element;

monitoring means for monitoring the ON-state of the non-diagnosis target switching element and for generating a monitoring signal; and processing means provided independently of the microcomputer for processing a diagnosis signal for the diagnosis target switching element and a monitoring signal as an AND signal, wherein the microcomputer generates the diagnosis signal when the diagnosis means performs diagnosis, and wherein the diagnosis means performs based on the AND signal only when the monitoring signal indicates the OFF-state of the non-diagnosis target switching element.

5. The activating device of a vehicular passenger protection system as in claim 4, wherein:

the inhibition means is provided with a monitoring circuit that monitors the operation of the microcomputer and generates a reset signal when abnormal operation is detected, and a reset-time ON-inhibition circuit for inhibiting the ON-state of the non-diagnosis switching element based on the reset signal; and the monitoring means generates the monitoring signal based on the reset signal.

6. The activating device of a vehicular passenger protection system as in claim 2, wherein the inhibition means includes:

a monitoring circuit that monitors the operation of the microcomputer and generates a reset signal when abnormal operation is detected;

a first inhibition circuit for inhibiting the non-diagnosis target switching element from being turned on based on the reset signal; and a second inhibition circuit for inhibiting the non-diagnosis target switching element from being turned on separately from the first inhibition circuit, wherein at least the monitoring circuit, the first inhibition circuit, the second inhibition circuit, and the remaining electronic switching elements are integrated in a single integrated circuit, and wherein the integrated circuit is provided with an input terminal for receiving a control signal of the second inhibition circuit, and receives the diagnosis signal from the input terminal.

7. The activating device of a vehicular passenger protection system as in claim 3, wherein the inhibition means includes:

a monitoring circuit that monitors the operation of the microcomputer and generates a reset signal when abnormal operation is detected;

a first inhibition circuit for inhibiting the non-diagnosis target switching element from being turned on based on the reset signal; and a second inhibition circuit for inhibiting the non-diagnosis target switching element from being turned on separately from the first inhibition circuit, wherein at least the monitoring circuit, the first inhibition circuit, the second inhibition circuit, and the remaining electronic switching elements are integrated in a single integrated circuit, and wherein the IC is provided with an input terminal for receiving a control signal of the second inhibition circuit, and receives the ON-inhibition signal from the input terminal.

* * * * *